US010534395B2

(12) United States Patent
Cerny et al.

(10) Patent No.: US 10,534,395 B2
(45) Date of Patent: *Jan. 14, 2020

(54) BACKWARD COMPATIBILITY THROUGH USE OF SPOOF CLOCK AND FINE GRAIN FREQUENCY CONTROL

(71) Applicant: Sony Interactive Entertainment LLC, San Mateo, CA (US)

(72) Inventors: Mark Evan Cerny, Los Angeles, CA (US); David Simpson, Los Angeles, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 149 days.

This patent is subject to a terminal disclaimer.

(21) Appl. No.: 15/701,736

(22) Filed: Sep. 12, 2017

(65) Prior Publication Data
US 2018/0004243 A1 Jan. 4, 2018

Related U.S. Application Data

(63) Continuation of application No. 14/627,988, filed on Feb. 20, 2015, now Pat. No. 9,760,113.

(51) Int. Cl.
G06F 1/08 (2006.01)
G06F 15/10 (2006.01)
(Continued)

(52) U.S. Cl.
CPC .................. G06F 1/08 (2013.01); G06F 9/44 (2013.01); G06F 9/455 (2013.01); G06F 15/10 (2013.01)

(58) Field of Classification Search
CPC . G06F 15/10; G06F 9/455; G06F 9/44; G06F 1/08
See application file for complete search history.

(56) References Cited

U.S. PATENT DOCUMENTS 4,787,032 A 11/1988 Culley
5,125,088 A 6/1992 Culley
(Continued)

FOREIGN PATENT DOCUMENTS

CN 1906576 A 1/2007
CN 103118290 B 11/2016
(Continued)

OTHER PUBLICATIONS

Final Office Action for U.S. Appl. No. 14/627,988, dated Dec. 21, 2016.
(Continued)

Primary Examiner — Vincent H Tran
(74) Attorney, Agent, or Firm — JDI Patent; Joshua Isenberg; Robert Pullman

(57) ABSTRACT

An application runs at a first operating frequency if the application is designed for a current version of a system and runs at a second operating frequency if the application is designed for a prior version of the system that operates at a lower frequency than the first operating frequency. The second operating frequency may be higher than the operating frequency of the prior version of the system to account for differences in latency, throughput or other processing characteristics between the two systems. Software readable cycle counters are based on a spoof clock running at the operating frequency of the prior version of the system, rather than the true operating frequency. It is emphasized that this abstract is provided to comply with the rules requiring an abstract that will allow a searcher or other reader to quickly ascertain the subject matter of the technical disclosure. It is submitted with the understanding that it will not be used to interpret or limit the scope or meaning of the claims.

21 Claims, 2 Drawing Sheets

(51) Int. Cl.
*G06F 9/44* (2018.01)
*G06F 9/455* (2018.01)

(56) References Cited

U.S. PATENT DOCUMENTS

| | | | | |
|---|---|---|---|---|
| 5,577,232 | A | * | 11/1996 | Priem ................ G06F 8/71 |
| | | | | 717/170 |
| 5,623,647 | A | | 4/1997 | Maitra |
| 6,278,338 | B1 | | 8/2001 | Jansson |
| 7,046,245 | B2 | | 5/2006 | Cerny et al. |
| 7,081,893 | B2 | | 7/2006 | Cerny |
| 7,451,491 | B2 | * | 11/2008 | Watanabe ............ G06F 21/57 |
| | | | | 713/1 |
| 7,786,993 | B2 | | 8/2010 | Cerny et al. |
| 8,031,192 | B2 | | 10/2011 | Cerny |
| 8,149,242 | B2 | | 4/2012 | Langyel et al. |
| 8,174,527 | B2 | | 5/2012 | Cerny et al. |
| 8,621,450 | B2 | | 12/2013 | Firman et al. |
| 9,760,113 | B2 | * | 9/2017 | Cerny ................ G06F 15/10 |
| 2002/0108064 | A1 | * | 8/2002 | Nunally ............ G06F 1/3203 |
| | | | | 713/300 |
| 2003/0112238 | A1 | | 6/2003 | Cerny et al. |
| 2003/0112240 | A1 | | 6/2003 | Cerny |
| 2004/0193998 | A1 | | 9/2004 | Blackburn et al. |
| 2005/0076253 | A1 | | 4/2005 | Lu |
| 2006/0001674 | A1 | | 1/2006 | Cerny et al. |
| 2006/0075397 | A1 | | 4/2006 | Kasahara |
| 2006/0225058 | A1 | | 10/2006 | Ottamalika et al. |
| 2007/0002049 | A1 | | 1/2007 | Cerny |
| 2008/0168189 | A1 | | 7/2008 | Aldaz et al. |
| 2009/0002380 | A1 | | 1/2009 | Langyel et al. |
| 2009/0070609 | A1 | | 3/2009 | Kahle et al. |
| 2010/0199118 | A1 | | 8/2010 | Froemming |
| 2010/0218029 | A1 | | 8/2010 | Floyd et al. |
| 2010/0262958 | A1 | | 10/2010 | Clinton et al. |
| 2010/0283783 | A1 | | 11/2010 | Cerny et al. |
| 2011/0004575 | A1 | | 1/2011 | Yang et al. |
| 2011/0138214 | A1 | | 6/2011 | Tseng et al. |
| 2011/0314306 | A1 | | 12/2011 | Lin et al. |
| 2012/0020404 | A1 | | 1/2012 | Hsieh et al. |
| 2012/0144378 | A1 | | 6/2012 | Shah |
| 2012/0227061 | A1 | | 9/2012 | Hunt et al. |
| 2014/0002484 | A1 | | 1/2014 | Lynch et al. |
| 2014/0082612 | A1 | | 3/2014 | Breitgand et al. |
| 2014/0362081 | A1 | | 12/2014 | Cerny et al. |
| 2014/0362100 | A1 | | 12/2014 | Cerny et al. |
| 2014/0362101 | A1 | | 12/2014 | Cerny et al. |
| 2014/0362102 | A1 | | 12/2014 | Cerny et al. |
| 2015/0287158 | A1 | | 10/2015 | Cerny et al. |
| 2015/0287166 | A1 | | 10/2015 | Cerny |
| 2015/0287167 | A1 | | 10/2015 | Cerny |
| 2015/0287230 | A1 | | 10/2015 | Cerny |
| 2015/0287232 | A1 | | 10/2015 | Cerny |
| 2016/0116954 | A1 | | 4/2016 | Zhuang et al. |

FOREIGN PATENT DOCUMENTS

| | | |
|---|---|---|
| CN | 103493011 B | 12/2016 |
| TW | I417703 B | 12/2013 |
| TW | I460572 B | 11/2014 |
| WO | 2000038038 A1 | 6/2000 |

OTHER PUBLICATIONS

International Search Report and Written Opinion for International Application No. PCT/US2016/018346, dated Jun. 9, 2016.
Non-Final Office Action for U.S. Appl. No. 14/627,988, dated Aug. 16, 2016.
Taiwanese Search Report for TW Application No. 105102350, dated Sep. 29, 2016.
U.S. Appl. No. 14/627,988, to Mark Evan Cerny, filed Feb. 20, 2015.
U.S. Appl. No. 14/810,334, to Mark Evan Cerny, filed Jul. 27, 2015.
U.S. Appl. No. 14/930,408, to Mark Evan Cerny, filed Nov. 2, 2015.
Decision of Refusal dated Jun. 26, 2018 for Japanese Patent application No. 2017-543996.
Decision of Rejection dated May 22, 2019 for Chinese Patent Application No. 201680010968.X.
EPC Rule 94(3) Communication dated Mar. 15, 2019 for European patent application 16753011.2.
Extended European Search Report dated Jun. 22, 2018 for EP16765301 1.2.
Office Action dated May 22, 2018 for Chinese Patent Application 201680010968.X.
Office Action dated Oct. 30, 2018 for Taiwan Patent Application No. 106142239.

* cited by examiner

BACKWARD COMPATIBILITY THROUGH USE OF SPOOF CLOCK AND FINE GRAIN FREQUENCY CONTROL

CLAIM OF PRIORITY

This application is a continuation of U.S. patent application Ser. No. 14/627,988 filed Feb. 20, 2015, the entire contents of which are incorporated herein by reference.

FIELD OF THE DISCLOSURE

Aspects of the present disclosure are related to execution of a computer application on a computer system. In particular, aspects of the present disclosure are related to a system or a method that provides backward compatibility for applications/titles designed for older versions of a computer system.

BACKGROUND

Modern computer systems often use different processors for different computing tasks. In addition to a central processing unit (CPU), a modern computer may have a graphics processing unit (GPU) dedicated to certain computational tasks in a graphics pipeline, both being potentially part of an accelerated processing unit (APU) that may contain other units as well.

More powerful central processing units (CPUs), graphic processing units (GPUs) and accelerated processing units (APUs) may have higher latency, or latency characteristics that differ from less powerful components. For example, a more powerful GPU may have more stages in its texture pipeline when compared to a less powerful GPU. In such a case, the latency of this pipeline increases. In another example, a more powerful APU may contain a L3 cache for the CPU, compared to a less powerful APU that did not have such a cache. In such a case, the memory latency characteristics differ as the time needed to access data that misses all caches increases for the more powerful APU, but average latency will decrease for the more powerful APU.

The more powerful device and the less powerful device may be able to perform the same processing (e.g., execution of program instructions on the CPU or various programmatic and fixed function operations on the GPU), but differences in latency of this processing may cause the more powerful device to fail to be backwards compatible with respect to the less powerful device. Similarly, there may be differences in speed or throughput of the processing that cause the more powerful device to fail to be backwards compatible. For example, for certain types of processing, the more powerful device may be able to perform more iterations of the processing within the same time interval. Alternatively, the more powerful device could perform the processing using different algorithms that result in behavior that is faster or slower than the less powerful device, depending on the circumstance.

In the case of video game consoles, the operation is typically at a set clock frequency, and the software applications are tested for proper operation at this set frequency. Sometimes, it is desirable to run applications created for the original, less powerful console on a more powerful console. This ability is often referred to as "backward compatibility". In such cases, it is desirable for the more powerful device to be able to run the application created for the less powerful device without detrimental effects of differences in latency or processing speed.

It is within this context that aspects of the present disclosure arise.

BRIEF DESCRIPTION OF THE DRAWINGS

The teachings of the present disclosure can be readily understood by considering the following detailed description in conjunction with the accompanying drawings, in which.

DESCRIPTION OF THE DRAWINGS

Figure 1:
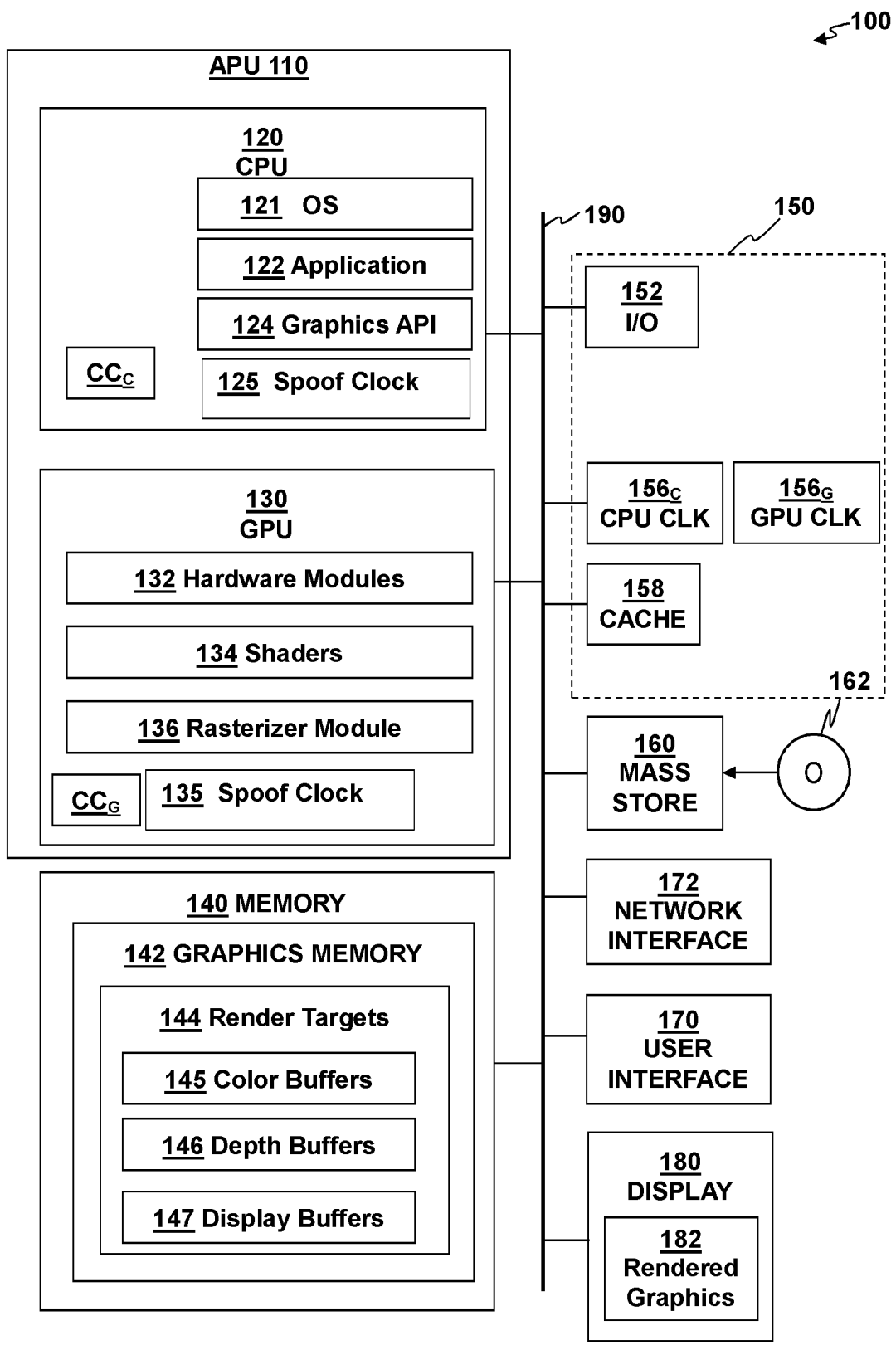
FIG. 1 is a block diagram illustrating a system that may be configured at various operating frequencies in accordance with aspects of the present disclosure.

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

Several methods may be used for running applications created for the less powerful console on the more powerful console. In one example, the more powerful console may be set to run at the frequency of the original console. At this frequency setting, the operation of the more powerful console will vary based on the specific processing being performed at any instant of time, and may be slower or faster than the less powerful console due to the latency (and other) characteristics of that specific processing being performed. When the operation of the more powerful console is slower than the original console, many errors in the application may arise due to the inability to meet real time deadlines imposed by display timing, audio streamout or the like.

In another example, the more powerful console may be set to run at a much higher frequency than the original console. Speed of operation will vary based on the specifics of the processing being performed, but it will be consistently higher than on the original console and thus real time deadlines can be met successfully. However, many errors in the application may arise due to the untested consequences of such high speed operation. For example, in a producer-consumer model, if the consumer of data operates at higher speed than originally anticipated, it may attempt to access data before the data producer makes it available, and although synchronization mechanisms may exist they are unlikely to be tested under such conditions on the original console. Alternatively, if the producer of the data operates at higher speed than originally anticipated, it may overwrite data still being used by the data consumer.

EMBODIMENTS

Embodiments of the present disclosure provide a system and a method of setting a console (i.e., more powerful console) to run at a higher frequency than a prior version of the console (i.e., less powerful console). Ideally the frequency of the more powerful console is set slightly higher than the operating frequency of the original console, as the speed of operation of the more powerful console varies based on the specifics of the processing being performed at any instant. With such configuration, the incidence of errors may be minimized because the speed of operation is not great enough to trigger the unintended consequences of high speed operation, nor will it be low enough to fail to meet real time deadlines.

Specifically, without the need to counter the effects of differences in latency, throughput or other aspects of processing, a more powerful console could be operated at only two frequencies: a higher frequency for applications created to run on the more powerful console, and the same frequency as the original console for backwards compatibility (i.e., when running applications created for the original console). But due to the need to counter the effects of differences in latency, throughput, and other aspects of processing, it is desirable to have fine grain control over the frequency of operation, so that the more powerful console can be run at frequencies slightly higher than the original console. The exact frequency setting could be determined by experimentation using both consoles and various software applications, or the frequency setting could vary by application, or the frequency setting could vary on a moment to moment basis depending on the performance characteristics of the application.

It is noted that the software application may have access to a cycle counter, e.g., a counter of cycles of operation of the CPU or GPU, or alternatively a counter that increments at a slower rate, for example the counter may increment every time the CPU or GPU has completed 16 clock cycles. As the frequency of the CPU and GPU is fixed on the original console, the application may be relying on the consistency of this timing. For example, the software application may be making assumptions regarding the ratio of clocks between CPU and GPU. Alternatively, the application may be using the GPU cycle counter to calculate the time to the next vertical blanking interval and then modify the rendering operations being performed so as to ensure that all rendering is complete prior to the start of vertical blank.

When this same software application is run at a higher frequency on the more powerful console, many errors may arise from its use of the cycle counter. For example, as at a higher frequency the number of cycles between vertical blanking intervals would be greater, the calculation concerning available time before the start of the next vertical blanking interval would be incorrect, leading to improper decisions as to what rendering is performed and potentially fatal errors.

Therefore, aspects of the present disclosure also provide a system and method of replacing the true cycle counter with a spoof clock which returns a number that corresponds to the frequency of the less powerful console. Whether reading the cycle counter returns the true cycle count, or whether instead it returns the value of the spoof clock, depends on the use case and would be configured by the operating system. Embodiments of the present disclosure provide a system configured to operate in two modes. The first mode is a normal mode in which the system operates at a normal frequency of operation, and the second mode is a compatible mode in which the system operates on the assumption of compatibility between the system and other ones (e.g., old versions of the system). The system is configured to be activated and operated in the normal mode. However, when an application or a title originally designed for the older versions of the system is run, the system may be configured to switch to a suitable operating frequency for the loaded application.

Turning now to FIG. 1, an illustrative example of a computing system 100 configured to be operated at various frequencies in accordance with aspects of the present disclosure is depicted. According to aspects of the present disclosure, the system 100 may be an embedded system, mobile phone, personal computer, tablet computer, portable game device, workstation, game console, and the like.

The system may generally include a processor and memory configured to implement aspects of the present disclosure, e.g., by performing a method having features in common with the method of FIG. 2, which is discussed below. In the illustrated example, the processor is an accelerated processing unit 110 that includes a central processing unit (CPU) 120, and a graphics processing unit (GPU) 130 on a single chip. In alternative implementations, the CPU 120 and GPU 130 may be implemented as separate hardware components on separate chips. The system 100 may also include memory 140. The memory 140 may optionally include a main memory unit that is accessible to the CPU 120 and GPU 130, and portions of the main memory may optionally include portions of the graphics memory 142. The CPU 120 and GPU 130 may each include one or more processor cores, e.g., a single core, two cores, four cores, eight cores, or more. The CPU 120 and GPU 130 may be configured to access one or more memory units using a data bus 190, and, in some implementations, it may be useful for the system 100 to include two or more different buses.

The memory 140 may include one or more memory units in the form of integrated circuits that provides addressable memory, e.g., RAM, DRAM, and the like. The memory contains executable instructions configured to implement a method of FIG. 2 upon execution for determining an operating frequency for the system. In addition, the graphics memory 142 may temporarily store graphics resources, graphics buffers, and other graphics data for a graphics rendering pipeline. The graphics buffers may include, e.g., one or more vertex buffers for storing vertex parameter values and one or more index buffers for storing vertex indices. The graphics buffers may also include one or more render targets 144, which may include both color buffers 145 and depth buffers 146 holding pixel/sample values computed according to aspects of the present disclosure. In certain implementations, the color buffers 145 and/or depth buffers 146 may be used to determine a final array of display pixel color values to be stored in a display buffer 147, which may make up a final rendered image intended for presentation on a display. In certain implementations, the display buffer may include a front buffer and one or more back buffers, and the GPU 130 may be configured to scanout graphics frames from the front buffer of the display buffer 147 for presentation on a display 180.

The CPU 120 may be configured to execute CPU code, which may include operating system 121 or an application 122 utilizing rendered graphics (such as a video game) and a corresponding graphics API 124 for issuing draw commands or draw calls to programs implemented by the GPU 130 based on the state of the application 122. The CPU code may also implement physics simulations and other functions. The CPU and GPU clocks $156_C$, $156_G$ may be configured to allow the CPU and GPU to execute instructions based on a clock rate that is different from a standard clock rate of the system 100. By way of example, and not by way of limitation, if the application 122 is for a less powerful version of the system 100, the value of the clock frequencies $156_C$, $156_G$ may correspond to clock frequencies of the less powerful version, or a slightly higher frequency than that if there are issues arising from higher latency in the system 100.

To support the rendering of graphics, the GPU 130 may execute shaders 134, which may include vertex shaders and pixel shaders. The GPU may also execute other shader programs, such as, e.g., geometry shaders, tessellation shaders, compute shaders, and the like. The GPU 130 may also include specialized hardware modules 132, which may include one or more texture mapping units and/or other hardware modules configured to implement operations at one or more stages of a graphics pipeline. The shaders 134 and hardware modules 132 may interface with data in the memory 140 and the buffers 144 at various stages in the pipeline before the final pixel values are output to a display. The shaders 134 and/or other programs configured to be executed by the APU 110, CPU 120 and GPU 130 may be stored as instructions in a non-transitory computer readable medium. By way of example, and not by way of implementations, the GPU may implement a rasterizer module 136, which may be configured to take multiple samples of primitives for screen space pixels and invoke one or more pixel shaders according to the nature of the samples.

The system 100 may also include well-known support functions 150, which may communicate with other components of the system, e.g., via the bus 190. Such support functions may include, but are not limited to, input/output (I/O) elements 152, one or more clocks, which may include separate clocks $156c$, $156_G$ for the CPU 120 and GPU 130, respectively, and a cache 158. The system 100 may optionally include a mass storage device 160 such as a disk drive, CD-ROM drive, flash memory, tape drive, Blu-ray drive, or the like to store programs and/or data. In one example, the mass storage device 160 may receive a computer readable medium 162 containing a legacy application originally designed to run on a less powerful system. Alternatively, the legacy application 162 (or portions thereof) may be stored in memory 140 or partly in the cache 158.

The device 100 may also include a display unit 180 to present rendered graphics 182 to a user and user interface unit 170 to facilitate interaction between the system 100 and a user. The display unit 180 may be in the form of a flat panel display, cathode ray tube (CRT) screen, touch screen, head mounted display (HMD) or other device that can display text, numerals, graphical symbols, or images. The display 180 may display rendered graphics 182 processed in accordance with various techniques described herein. The user interface 170 may contain one or more peripherals, such as a keyboard, mouse, joystick, light pen, game controller, touch screen, and/or other device that may be used in conjunction with a graphical user interface (GUI). In certain implementations, the state of the application 122 and the underlying content of the graphics may be determined at least in part by user input through the user interface 170, e.g., in video gaming implementations where the application 122 includes a video game.

The system 100 may also include a network interface 172 to enable the device to communicate with other devices over a network. The network may be, e.g., a local area network (LAN), a wide area network such as the internet, a personal area network, such as a Bluetooth network or other type of network. Various ones of the components shown and described may be implemented in hardware, software, or firmware, or some combination of two or more of these.

According to aspects of the present disclosure, the CPU 120 may include hardware components that implement a cycle counter $CC_C$ to synchronize execution of CPU operations. The GPU 130 may similarly include hardware components that implement a cycle counter $CC_G$ to synchronize execution of GPU operations. The cycle counters $CC_C$, $CC_G$ read clock cycles from a clock, which may be a corresponding standard clock $156_C$, $156_G$ or a corresponding spoof clock 125, 135. According to aspects of the present disclosure, when running applications written for the current version of the system 100, the cycle counters $CC_C$, $CC_G$ may be configured to read cycles from the standard clocks $156_C$, $156_G$; whereas when running applications written for a less powerful version of the system, the cycle counters $CC_C$, $CC_G$ may be configured to read cycles from the spoof clocks 125, 135, which may be set to the standard operating frequency of the less powerful version of the hardware.

Figure 2:
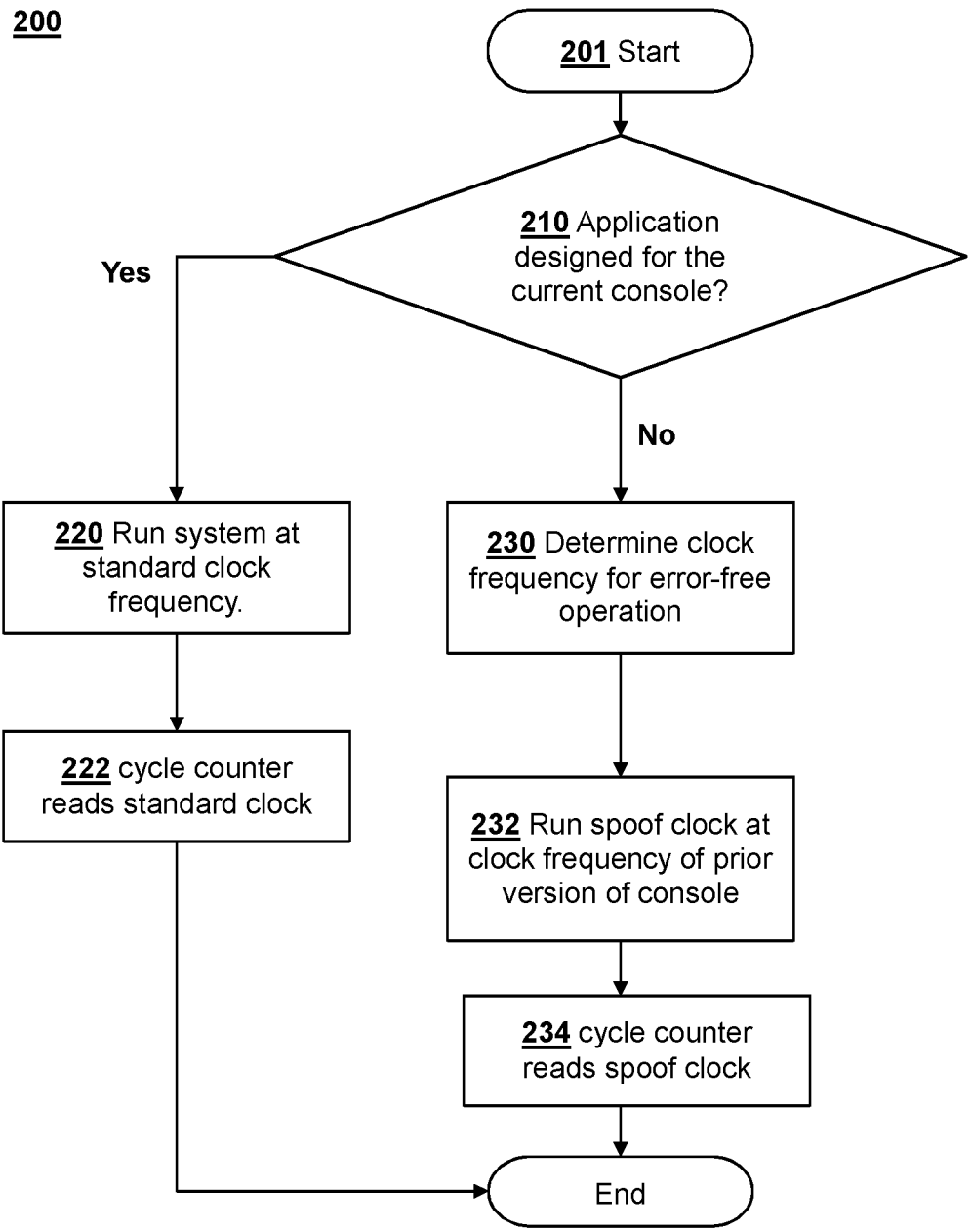
FIG. 2 is a flow diagram illustrating an example of a possible process flow in determining an operating frequency for a system in accordance with aspects of the present disclosure.

FIG. 2 is a flow diagram illustrating an example of a possible process flow in determining frequency of the operation for a console in accordance with aspects of the present disclosure, as implemented by the operating system 121, or other software or hardware mechanisms. At 201, operation may start in a normal mode when an application 122 is loaded to run on the system 100. First, via an examination of the software ID, software checksum, metadata associated with the software, media type, or other mechanism, a determination is made if the application 122 is designed for this system or for the prior versions of the system, as indicated at 210. When it is determined that the loaded application is intended for the system 100, the system may run at a normal frequency, as indicated at 220. For example, the CPU 120 and GPU 130 may run at their normal operating frequencies, respectively. In particular the cycle counters $CC_C$, $CC_G$ may read the corresponding clocks $156c$ and $156_G$, as indicated at 222.

When the loaded application 122 is designed for a less powerful version of the system 100, the system may determine a clock frequency for error-free operation, as indicated at 230. By way of example, and not by way of limitation, the clocks $156_C$, $156_G$ may be set to run the CPU 120 and GPU 130 at slightly higher frequencies than the corresponding clock frequencies in the less powerful system. Alternatively, the clock frequencies $156c$, $156_G$ may be adjusted in real time such that as the speed of operation of the system 100 varies based on the specifics of the processing being performed at any instant, processing occurs at the same speed or a slightly faster speed than the less powerful system. The clock frequencies may be determined in a way that takes into account effects of higher latency, throughput and other aspects of processing with CPU 120 and/or GPU 130. The spoof clock frequencies 125, 135 are set to correspond to the standard frequencies of CPU and GPU operation of the less powerful system, as indicated at 232. In particular the cycle counters $CC_C$, $CC_G$ are configured read the corresponding spoof clocks 125 and 135, as indicated at 234.

To give an example, the GPU of the prior version of the system might run at a GPU clock of 500 MHz, and the current system might run at a GPU clock $156_G$ of 750 MHz. The system would run with $156_G$ set to 750 MHz when an application is loaded that is designed only for the current system. In this example, the cycle counter $CC_G$ would correspond to the 750 MHz frequency (i.e., it is a true cycle counter). When a legacy application (i.e., an application designed for the prior version of the system) is loaded, the system 100 may run at a frequency slightly higher than the operating frequency of the prior system (e.g., with $156_G$ set to 505 MHz). In this backward compatible mode, the GPU spoof clock 135 would be configured to run at 500 MHz, and the cycle counter $CC_G$ would be derived from the spoof clock, thus providing the expected value to the legacy application.

The current system may differ from the prior system in terms of latency characteristics, throughput, or algorithms employed in computations, so while the results of the computation may be the same, the speed of operation of the console will vary based on the specifics of the operations performed. As a result, when the loaded application 122 is a legacy application, it may be desirable to set the clocks $156_C$, $156_G$ to values determined by testing of the specific application loaded, for example by running at the higher clock frequency and reducing the effective clock frequency incrementally until processing errors no longer arise. It may also be desirable to dynamically adjust the clocks $156c$, $156_G$ based on the performance characteristics of the application.

Aspects of the present disclosure overcome problems with backward compatibility that arise when programs written for a less powerful system run on a more powerful system. Adjusting the system clock rate of the more powerful system accommodates for differences between the devices. Basing readable cycle counters on a spoof clock in place of the true clock allows correct operation of legacy application code.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A method, comprising:
   after it is determined whether an application loaded on a current version of a system is for the current version of the system or a less powerful version of the system,
   a) running the application on a processor at a standard clock frequency of a current version of the system when the application is designed for the current version of a system; and
   b) running the application at a second clock frequency when the application is designed for a less powerful version of the system, wherein the less powerful version of the system is characterized by a different standard clock frequency, wherein the second clock frequency is less than the different standard clock frequency.

2. The method of claim 1, wherein the second clock frequency is higher than the different standard clock frequency.

3. The method of claim 1, wherein b) includes setting the second frequency based on the difference in latency or latency characteristics between the current and less powerful versions of the system, differences in throughput or speed of operation between the current and less powerful versions of the system, or differences between the current and less powerful versions of the system with regards to algorithms employed in computations.

4. The method of claim 1, wherein the current version of the system includes a software readable cycle counter, which increments at the standard operating frequency of the less powerful version of the system or a rate so close to it as to avoid triggering errors in operation.

5. The method of claim 1, wherein the current version of the system includes a software readable cycle counter, wherein b) includes incrementing the cycle counter at the standard operating frequency of the less powerful system or a rate so close to it as to avoid triggering errors in operation, and a) includes incrementing the cycle counter at a different rate.

6. The method of claim 1, wherein a) includes setting the second operating frequency to different values for different applications.

7. The method of claim 1, wherein b) includes dynamically setting the second operating frequency based on the performance characteristics of the application currently running on the processor.

8. The method of claim 1, wherein b) further includes determining the second operating frequency by taking into account differences in latency or latency characteristics between the current version and the less powerful version of the system.

9. The method of claim 1, wherein b) further includes determining the second operating frequency by taking into account differences in throughput between the current version and the less powerful version of the system.

10. The method of claim 1, wherein b) further includes determining the second operating frequency by taking into account differences between the current version and the less powerful version of the system with regards to algorithms used in computations.

11. A system, comprising:
    a processor;
    a memory; and
    processor executable instructions embodied in the memory, the instructions being configured to implement a method upon execution by the processor, the method comprising:
    after it is determined whether an application loaded on a current version of the system is for the current version of the system or a less powerful version of the system,
    a) running the application on a processor at a standard clock frequency of a current version of the system when the application is designed for the current version of the system; and
    b) running the application at a second clock frequency when the application is designed for a less powerful version of the system, wherein the less powerful version of the system is characterized by a different standard clock frequency, wherein the second clock frequency is less than the different standard clock frequency.

12. The system of claim 11, wherein the second clock frequency is higher than the different standard clock frequency.

13. The system of claim 11, wherein b) includes setting the second frequency based on the difference in latency or latency characteristics between the current and less powerful versions of the system, differences in throughput or speed of operation between the current and less powerful versions of the system, or differences between the current and less powerful versions of the system with regards to algorithms employed in computations.

14. The system of claim 11, wherein the current version of the system includes a software readable cycle counter, which increments at the standard clock frequency of the less powerful version of the system or a rate so close to it as to avoid triggering errors in operation.

15. The system of claim 11, wherein the current version of the system includes a software readable cycle counter, wherein b) includes incrementing the cycle counter at the standard clock frequency of the less powerful system or a rate so close to it as to avoid triggering errors in operation, and b) includes incrementing the cycle counter at a different rate.

16. The system of claim 11, wherein b) includes setting the second clock frequency to different values for different applications.

17. The system of claim 11, wherein b) includes dynamically setting the second operating frequency based on the performance characteristics of the application currently running on the processor.

18. The system of claim 11, wherein b) further includes determining the second operating frequency by taking into account differences in latency or latency characteristics between the current version and the less powerful version of the system.

19. The system of claim 11, wherein b) further includes determining the second operating frequency by taking into account differences in throughput between the current version and the less powerful version of the system.

20. The system of claim 11, wherein b) further includes determining the second operating frequency by taking into account differences between the current version and the less powerful version of the system with regards to algorithms used in computations.

21. A non-transitory computer readable medium having computer readable instructions embodied therein, the instructions being configured to implement a method upon execution by a processor, the method comprising:

after it is determined whether an application loaded on a current version of a system is for the current version of a system or a less powerful version of the system, a) running the application on a processor at a standard clock frequency of a current version of the system when the application is designed for the current version of the system; and b) running the application at a second clock frequency when the application is designed for a less powerful version of the system, wherein the less powerful version of the system is characterized by a different standard clock frequency, wherein the second clock frequency is less than the standard clock frequency of the current version of the system.

* * * * *